United States Patent Office 3,488,742
Patented Jan. 6, 1970

3,488,742
EPOXY RESINS CURED WITH DICYANDIAMIDE AND A CONDENSATE OF EQUIMOLAR PROPORTIONS OF PHTHALIC ANHYDRIDE AND DIETHYLENETRIAMINE
Henry Thomas Blekicki, Convent Station, and Raymond Michael Moran, Jr., Brick Town, N.J., assignors to Ciba Corporation, New York, N.Y., a corporation of Delaware
No Drawing. Filed Aug. 29, 1967, Ser. No. 663,951
Int. Cl. C08g 30/14
U.S. Cl. 260—830                                    6 Claims

ABSTRACT OF THE DISCLOSURE

The reaction product of approximately equimolecular proportions of phthalic anhydride and diethylenetriamine is an effective latent accelerator for dicyandiamide in the curing of epoxy resin systems. The combination of dicyandiamide with the said reaction product of phthalic anhydride and diethylenetriamine will provide systems when combined with epoxy resins which will be stable for long periods when stored at ambient temperatures while still providing hardened products of satisfactory properties on curing for relatively short periods at elevated temperatures.

BACKGROUND OF THE INVENTION

Various chemical substances have heretofore been employed as hardening agents for epoxy resins. Most usually, these chemical hardening agents have been organic acid anhydrides or amines, although other agents, such as boron trifluoride or complexes thereof are frequently used. Dicyandiamide has also been employed as an epoxy curing agent.

However, none of the previously employed hardening agents provide combinations on admixture with epoxy resins and in particular with epoxy resins which are completely satisfactory. Among the disadvantages which can be noted in such combinations are a limited shelf life or stability and/or the fact that relatively long cures at elevated temperatures are frequently required in order to achieve satisfactory cured properties.

The reaction product of approximately equimolar proportions of phthalic anhydride and diethylenetriamine is described in application Ser. No. 547,442, and reference is made to that application for the description of said product, its preparation and its use as an epoxy resin curing agent.

SUMMARY OF THE INVENTION

This invention relates to and has for its objects the provision of novel epoxy resin hardener compositions, hardenable epoxy resin compositions and cured products obtainable therefrom.

In accordance with the present invention, it has been found that the reaction product of approximately equimolecular proportions of phthalic anhydride and diethylenetriamine is a latent accelerator for dicyandiamide in the production of hardened products from epoxy resin systems. The combination of said reaction product with dicyandiamide when employed in epoxy resin compositions provides epoxy resin systems which are stable for long periods when stored at ambient temperatures or at moderately elevated temperatures while still providing on curing for relatively short periods at elevated temperatures, for example, for about 60 minutes at 150° C., hardened products of satisfactory properties. It is particularly notable that the properties obtained on curing combinations of epoxy resin and the novel hardener composition of the present invention which have been stored for periods of six months or longer are of the same order as the properties obtained on curing freshly prepared combinations of epoxy resin and the hardener composition of the present invention.

The novel curable compositions of the present invention are readily prepared by known mixing techniques familiar to those working in the epoxy resin field. On curing, the composition of the present invention yields cured products exhibiting very good properties.

DESCRIPTION OF THE PREFERRED EMBODIMENT

The epoxy compounds employed are the 1,2-epoxy compounds having a 1,2-epoxy equivalence greater than 1. As epoxide compounds there can be used esters such as are obtainable by the reaction of a di- or polybasic carboxylic acid with epichlorohydrin or dichlorohydrin in the presence of an alkali. Such polyesters may be derived from aliphatic dicarboxylic acids, such as oxalic acid, succinic acid, glutaric acid, adipic acid, pimelic acid, suberic acid, azelaic acid, sebaic acid, and especially aromatic dicarboxylic acids, such as phthalic acid, terephthalic acid, 2:6-naphthalene-dicarboxylic acid, diphenyl-ortho:ortho'-dicarboxylic acid, ethylene glycol, bis-(para-carboxy-phenyl)ether or the like. Others which may be used are, for example, diglycidyl adipate and diglycidyl phthalate, and also diglycidyl esters which correspond to the average formula:

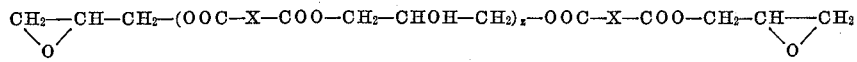

in which X represents an aromatic hydrocarbon radical, such as a phenyl group, and Z represents a small whole number or a small fractional number.

There may also be employed the polyglycidyl ethers such as are obtainable by the interaction of a dihydric or polyhydric alcohol or a diphenol or polyphenol with epichlorohydrin or related substances, for example, glycerol dichlorohydrin, under alkaline conditions or alternatively in the presence of an acidic catalyst with subsequent alkaline treatment. These compounds may be derived from glycols, such as ethylene glycol, diethylene glycol, triethylene glycol, propylene glycol-1:2, propylene glycol-1:3, butylene glycol-1:4, pentane-1:5-diol, hexane-1:6-diol, hexane-2:4:6-triol, glycerine and especially diphenols or polyphenols such as pyrocatechol, hydroquinone, 1:4-dioxynaphthalene, 1:5-dioxynaphthalene, phenyl-formaldehyde condensation products, cresolformaldehyde condensation products, bis-(4-hydroxyphenyl)-methane, bis-(4-hydroxyphenyl)-methyl-phenyl-methane, bis-(4-hydroxyphenyl)-tolylmethane, 4:4'-dioxydiphenyl, bis-(4-hydroxyphenyl)sulphone for (for preference) 2:2-bis-(4-hydroxyphenyl)propane. There may also be employed ethylene glycol diglycidyl ether and also diglycidyl ethers which correspond to the average formula:

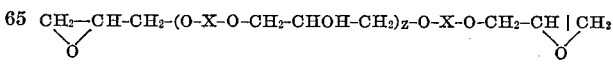

in which X represents an aromatic radical, and Z represents a small whole number or fractional number.

Especially suitable epoxide resins are those that are liquid at room temperature, for example, those obtained from 4:4'-dihydroxydiphenyl-dimethylmethane (Bisphenol-A), which have an epoxide content of about 3.8 to 5.88 epoxide equivalents per kilogram. Such epoxide resins correspond, for example, to the average formula:

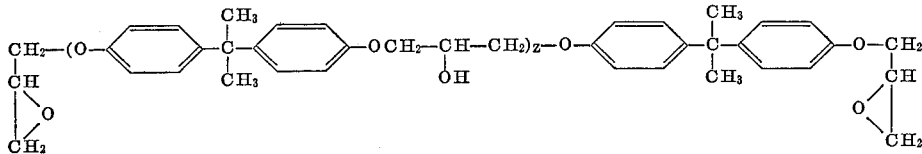

in which Z represents a small number or small fractional number, for example, between 0 and 2.

The ratio of dicyandiamide to reaction product of phthalic anhydride and diethylenetriamine can vary over a relatively wide range. In general, the proportion of dicyandiamide to reaction product will be from about 3:1 to about 1:1, with a ratio of 2:1 representing the preferred proportions.

The ratio of dicyandiamide to epoxy resin can vary over a wide range. Thus, the proportion of dicyandiamide to epoxy resin can range from about 4 parts of hardener to 100 parts of resin to about 15 parts of hardener to 100 parts of resin.

The following examples will serve to illustrate the invention. The parts referred to are parts by weight.

EXAMPLE 1

9064 parts of diethylene triamine are charged to a reaction vessel and heated to 100° C. The source of heat is then removed and a total of 3256 parts of phthalic anhydride are added in 220 part increments at intervals of twenty minutes. The reaction exotherm is held between 96° C. and 106° C. during the additions. When all of the phthalic anhydride has been added, the reaction mixture is brought to a temperature of 100° C. and held at this temperature for two hours. At the end of this period unreacted diethylenetriamine and water equivalent to about 1 mole of water per more of phthalic anhydride are removed by vacuum distillation under a partial pressure of 20 mm./Hg. The head temperature at the completion of distillation is about 110° C. and the batch temperature is about 160° C. The total weight of distillate received is 6850 parts. The vacuum is then broken and the product discharged into a tray and cooled.

The product is recovered in a yield of 5518 parts, has a softening point of about 104° C. and an amino nitrogen content of about 8.6% by titration with perchloric acid in glacial acetic acid.

EXAMPLE 2

Preparation of epoxy resin 520 parts of 2,2-bis(4-hydroxyphenyl) propane and 1300 parts of epichlorohydrin and 25 parts of water were heated to 60° C. with agitation and 180 parts of flaked sodium hydroxide are added in several increments and the temperature maintained at 60° C. for 30 minutes following the addition of the final increment. Unreacted epichlorohydrin and water are then removed under vacuum. The reaction mixture is cooled to 90° C. and about 700 parts of water are added. The mixture is agitated for 30 minutes at 90° C., permitted to settle and the brine layer is drawn off. The material is washed with water, vacuum stripped and cooled under vacuum and discharged. An epoxy resin is obtained having a Brookfield viscosity at 23° C. of 13,000 cps., and an epoxy value of 5.3 eg./kg.

EXAMPLE 3

A composition consisting of 10 parts of the reaction product of Example 1 and 20 parts of dicyandiamide is prepared by separately micropulverizing each component to a particle size of about 100 microns and dry-blending the micropulverized components in a Waring blender at ambient temperature.

The resulting combination is employed as a curing composition in epoxy resin systems as described in Example 4.

EXAMPLE 4

15 parts of the composition of Example 3 are combined with 100 parts of the epoxy resin of Example 2 on a 3-roll mill at 25° C. The resultant combination is employed to form and test and aluminum to aluminum adhesive bond in accordance with MIL-A-5090D, "Adhesive Heat Resistance, Airframe Structural, Metal-to-Metal," curing of the combination being effected by heating for 60 minutes at 150° C.

Tensile shear strengths of 3460 pounds per square inch at 25° C., of 3350 pounds per square inch at 82° C., 2170 at 121° C. and of 700 pounds per square inch at 149° C. are obtained.

The above procedure is repeated on a combination of 100 parts of the epoxy resin of Example 2 and 15 parts of the composition of Example 3 which has been stored for 3 months at 25° C. The same satisfactory properties are realized when the composition is cured for 60 minutes at 150° C.

EXAMPLE 5

A combination of 5 parts of the reaction product of Example 1, 10 parts of dicyandiamide and 100 parts of the epoxy resin of Example 2 is prepared on a 3-roll mill at 25° C. The resultant combination is employed and tested as in Example 4. The same satisfactory properties are obtained.

What is claimed is:

1. A hardenable composition comprising (a) a 1,2-epoxy compound having a 1,2-epoxy equivalency greater than 1, (b) as curing agent, dicyandiamide, and (c) as accelerator, the condensation product obtained by reacting approximately equimolecular proportions of phthalic anhydride and diethylenetriamine in which the ratio of (a) to (b) is from about 100:4 to about 100:15 and the ratio of (b) to (c) is from about 3:1 to about 1:1.

2. A composition according to claim 1 wherein the 1,2-epoxy compound is a polyglycidyl ether of a polyhydric phenol.

3. A composition according to claim 2 wherein the polyhydric phenol is bis(para-hydroxyphenol)-dimethylmethane.

4. A process for the preparation of a hardened resinous mass which comprises contacting a 1,2-epoxy compound having a 1,2-epoxy equivalent greater than 1 with dicyandiamide as a curing agent and the condensation product obtained by reacting approximately equimolecular proportions of phthalic anhydride and diethylenetriamine as accelerator in which the ratio of (a) to (b) is from about 100:4 to about 100:15 and the ratio of (b) to (c) is from about 3:1 to about 1:1.

5. A hardened resinous mass obtained by contacting a 1,2-epoxy compound having a 1,2-epoxy equivalent greater than 1 with dicyandiamide as a curing agent and the condensation product obtained by reacting approximately equimolecular proportions of phthalic anhydride and diethylenetriamine as accelerator in which the ratio of (a) to (b) is from about 100:4 to about 100:15 and the ratio of (b) to (c) is from about 3:1 to about 1:1.

6. A composition for curing 1,2-epoxy compounds having a 1,2-epoxy equivalency greater than 1 consisting essentially of dicyandiamide and the condensation product obtainel by reacting approximately equimolecular porportions of phthalic anhydride and diethylenetriamine in which the ratio of (a) to (b) is from about 100:4 to about 100:15 and the ratio of (b) to (c) is from about 3:1 to about 1:1.

References Cited

UNITED STATES PATENTS

| | | | |
|---|---|---|---|
| 3,012,050 | 12/1961 | Fox | 260—501 |
| 2,637,715 | 5/1953 | Ott | 260—831 |
| 2,637,716 | 5/1953 | Ott | 260—831 |

FOREIGN PATENTS 789,108  1/1958  Great Britian.

MURRAY TILLMAN, Primary Examiner

P. LIEBERMAN, Assistant Examiner

161—186; 260—47.2, 78